United States Patent [19]
Marshall et al.

[11] Patent Number: 5,701,981
[45] Date of Patent: Dec. 30, 1997

[54] RETRACTABLE POWER CORD

[76] Inventors: Trevor Marshall, 54 Deerbrook Trail, Scarborough, Ontario, Canada, M1W 1V4; Joseph Wing-Tak Hui, 829 Hooshang Ct., Cupertino, Calif. 95014; Thomas Wong, #1001, 3227 King St. East, Kitchener, Ontario, Canada, N2A 3Z9

[21] Appl. No.: 615,685

[22] Filed: Mar. 13, 1996

[51] Int. Cl.$^6$ ............................................. H02G 1/00
[52] U.S. Cl. ................................. 191/12.4; 439/501
[58] Field of Search .................. 439/4, 501; 191/12.2 R, 191/12.4

[56] References Cited

U.S. PATENT DOCUMENTS

| | | | |
|---|---|---|---|
| 1,882,385 | 10/1932 | Johnson | 191/12.2 R |
| 2,007,699 | 7/1935 | Wiebking | 191/12.4 |
| 2,585,070 | 2/1952 | Allard | 191/12.2 R X |
| 2,820,112 | 1/1958 | Lupu | 191/12.2 R |
| 2,912,525 | 11/1959 | Ures | 191/12.2 R |
| 2,976,374 | 3/1961 | Poulsen | 191/12.4 |
| 2,979,576 | 4/1961 | Huber | 191/12.4 |
| 3,056,863 | 10/1962 | Johnson | |
| 3,296,387 | 1/1967 | Baigue | |
| 3,316,361 | 4/1967 | Thompson | |
| 3,346,705 | 10/1967 | Slinkard | |
| 3,566,332 | 2/1971 | Bonhomme | 191/12.4 X |
| 3,705,962 | 12/1972 | Banister | |
| 3,773,987 | 11/1973 | Davis et al. | |
| 3,815,078 | 6/1974 | Fedrick | |
| 3,826,879 | 7/1974 | Penn et al. | 191/12.2 R X |

FOREIGN PATENT DOCUMENTS

| | | | |
|---|---|---|---|
| 1077287 | 3/1960 | Germany | |
| 3736330 | 5/1989 | Germany | 439/501 |
| 881145 | 11/1961 | United Kingdom | |
| 8806353 | 8/1988 | WIPO | 439/4 |

Primary Examiner—Mark T. Le

[57] ABSTRACT

A retractable and extendable electrical cord, for positioning in a wall and having a hollow housing, one or more reels rotatably mounted within the hollow housing, an electrical cord wound upon each reel, a retraction spring connected to each reel for rewinding the reel to retract the cord, first and second electrical contact members mounted on the reel in spaced apart relation, and ends of the electrical cord being connected to the contacts of said reel, first and second contact rings mounted within the housing and engageable by respective first and second electrical contacts, as the reel rotates, and electrical supply connections connected to the first and second contact rings. Also disclosed is a portable electrical cord extension and retraction device which can be plugged in to a conventional wall socket so that the cord can be extended to reach an appliance, and can be retracted when not required.

22 Claims, 4 Drawing Sheets

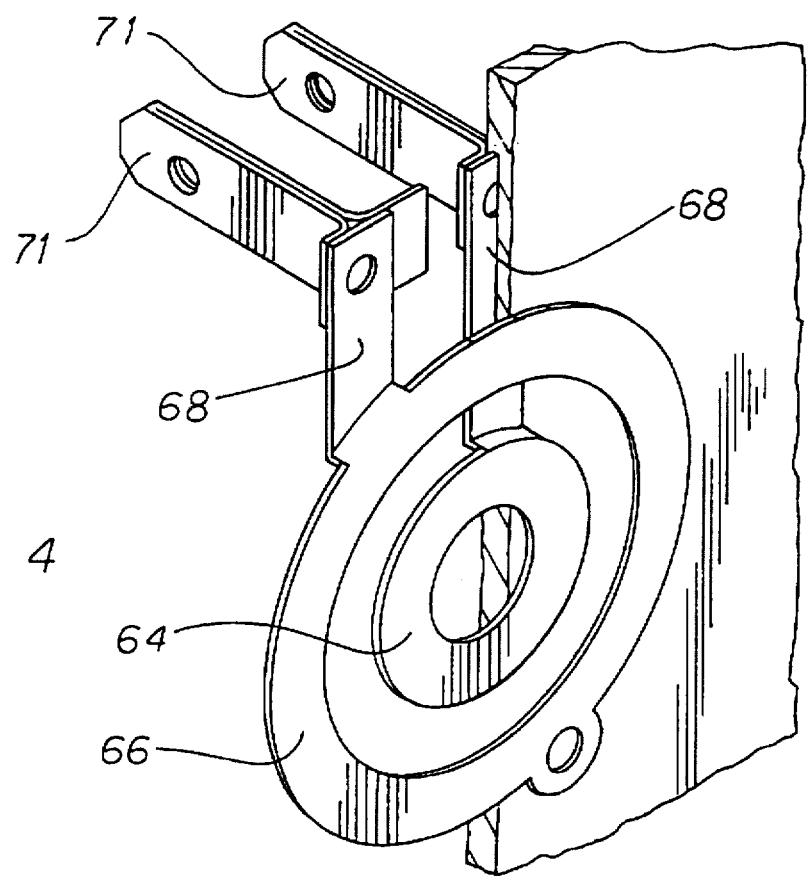
FIG. 4
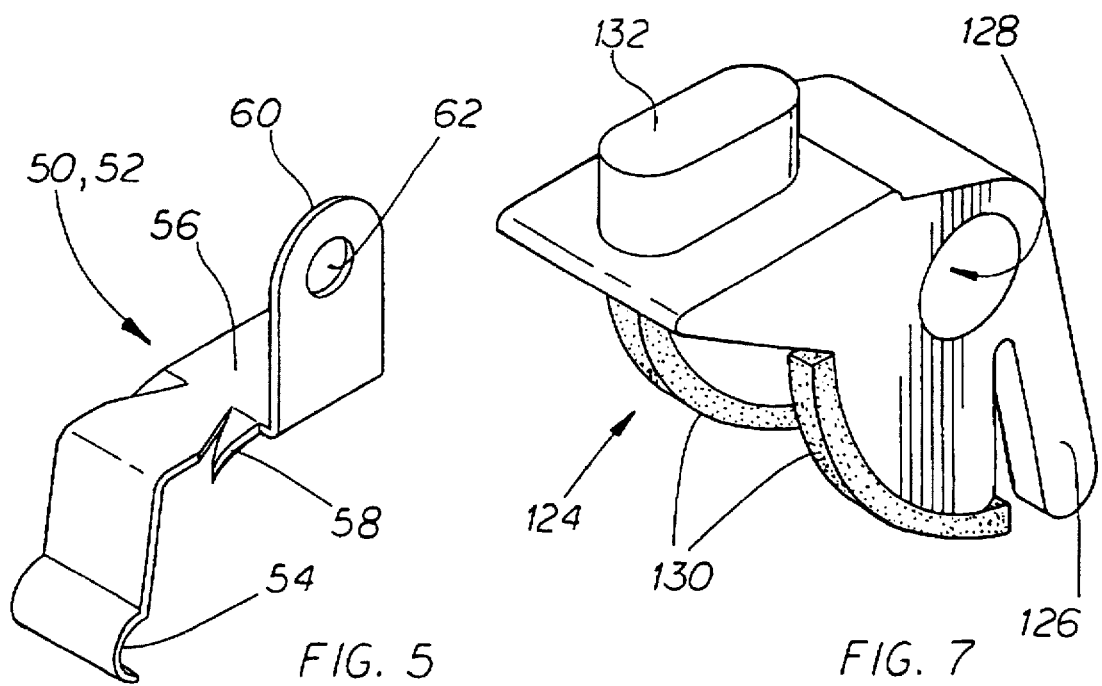
FIG. 5
FIG. 7

RETRACTABLE POWER CORD

FIELD OF THE INVENTION

The invention relates to a retractable electrical cord apparatus, which can be mounted in a wall and connected to the electrical power supply, or which can be used in association with a wall receptacle. The cord apparatus may also be used in association with other forms of electrical cords.

BACKGROUND OF THE INVENTION

Electrical power cords, and other forms of electrical connections are usually plugged into some form of receptacle in a wall or other structure. As is well known, such cords are usually of excess length, and will simply lie in loops on the floor. In this situation, they may easily get damaged, or they may cause persons to trip. In addition, it is easy for them to become mixed up.

Various proposals have been made for retractable extension cords in the past. However they have not been entirely satisfactory. One of the problems in any such proposal is that the cord when it is retracted must be stored neatly so that it may be repeatedly extended or pulled out as required. When it is extended the cord must still have inner cord ends which are connected to electrical power or which may be so connected.

Retractable extension cords are also known on certain electrical appliances, in particular, on vacuum cleaners. However these are built into the structure of the vacuum cleaner apparatus itself, and simply enable the vacuum cleaner cord to pulled out and plugged into a wall receptacle.

They do not deal will the problem of providing a retractable electrical cord which can which can be mounted in the wall and can then be extended and connected to any piece of electrical equipment as desired, and which can be retracted back into the wall when not required. Other forms of the invention provide a portable cord unit which can be plugged into a receptacle.

BRIEF SUMMARY OF THE INVENTION

With a view to providing a retractable and extendable electrical cord, which can be built into a wall for interconnection between a wall power source and a piece of electrical equipment, the invention provides a hollow housing, at least one reel means rotatably mounted within the hollow housing, an electrical cord wound upon said reel means, a retraction spring connected to the reel means, and adapted for rewinding the reel means to retract the cord, first and second electrical contact members mounted on said reel means in spaced apart relation, and ends of said electrical cord being connected to said contact members, first and second contact rings mounted within said housing and engageable by respective first and second electrical contact members, as said reel means rotates, electrical supply means connectable to said first and second contact rings, whereby an electrical supply can be supplied thereto, and communicated from said contact rings to respective said electrical contact members on said reel means.

The invention provides in one embodiment one or more such reel means mounted in a common housing and which can be installed in an electrical box in a wall, in place of the conventional receptacle.

The invention further provides such a retractable cord apparatus in which each reel is formed of a main body component having a flange on one side, and a secondary flange component attachable to said main body component, and first and second electrical contact recesses formed in said main body component for securely mounting said first and second contact members therein.

The invention further provides such a retractable extension cord in which the housing is made up of first and second shell parts, adapted to interfit together to enclose the reel(s), and the shell parts holding respective pairs of contact rings on opposite sides of the housing for supplying power to respective reels, there being two (or more) reels mounted in side by side relation carrying respective cords.

The invention provides in another embodiment forward and rear shell parts make up the housing. The rear shell part supports connection prongs for insertion into a conventional receptacle, and the forward portion having an annular ring, for retaining a return spring therein.

The invention further provides such an extension cord wherein the rear shell part has means for positioning two annular spaced apart contact rings therein, and first and second electrical connecting means for connecting to said rings, and the electrical prongs for insertion into a wall receptacle being integrally moulded into the rear shell part.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is an exploded view of the two part reel;

FIG. 4 is a perspective view of two contact rings; other contact rings being essentially similar;

FIG. 5 is a perspective view of a contact;

DESCRIPTION OF A SPECIFIC EMBODIMENT

As explained above, the invention relates to a retractable and extendable electrical cord, including a reel assembly on which the cord is wound and rotatable retraction means for the cord, and provided with rotatable contacts by means of which a cord can be extended any distance desired, and the contacts will always maintain an electrical circuit, regardless of the degree of extension or retraction of the cord. In one embodiment of the invention the reel assembly can incorporate one, two or more, reels and respective extension cords, and can be incorporated in an electrical receptacle box mounted in a wall. In another embodiment the entire cord assembly is portable and can be plugged directly into a typical wall receptacle.

Figure 1:
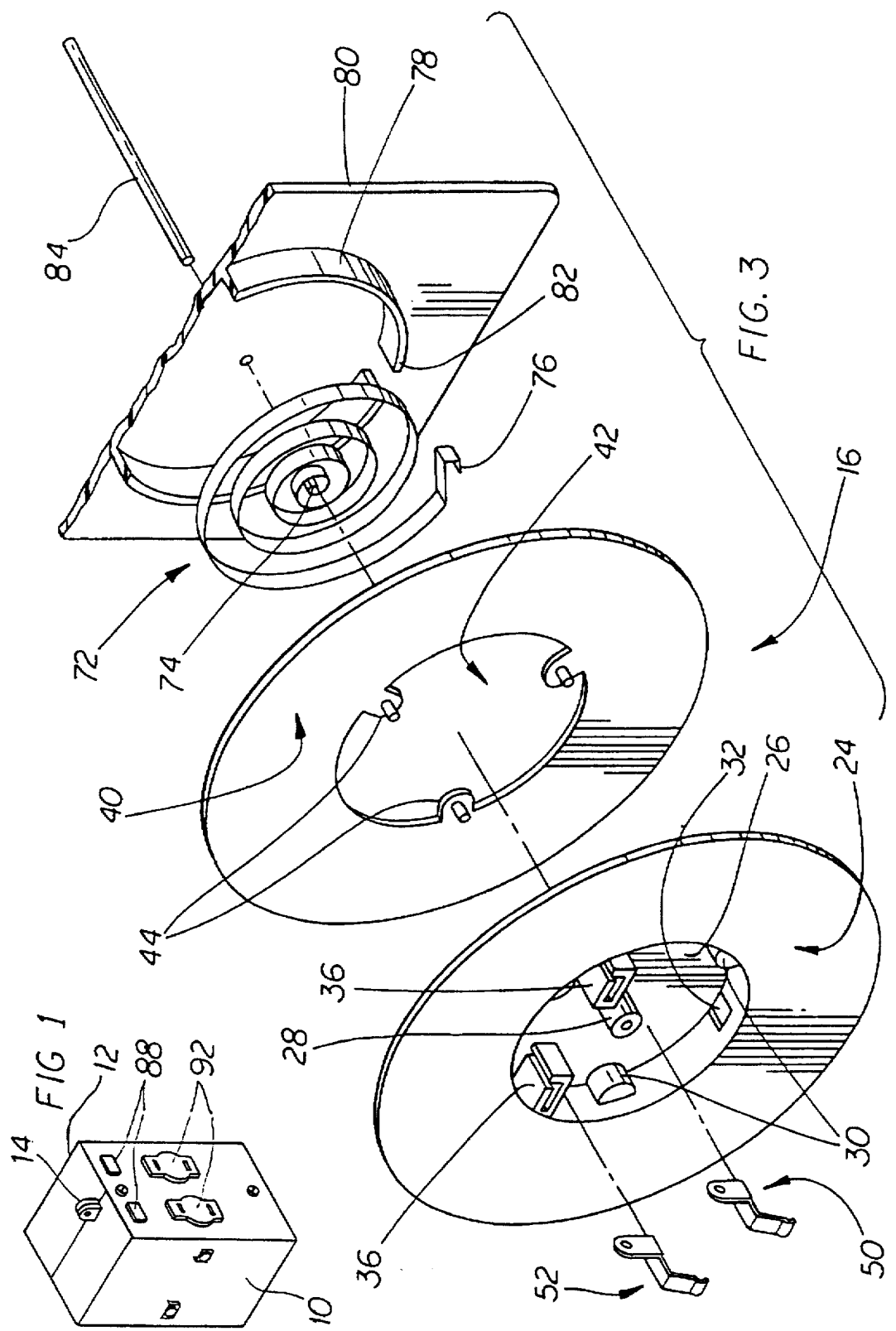
FIG. 1 is an perspective of a wall mounted fixture.

Referring first of all to FIG. 1, it will be seen that this illustrates a double cord embodiment of extendable and retractable cord assembly, illustrating one embodiment of the invention, for installation in an electrical box in a wall.

It will be seen to comprise housing shell parts 10 and 12, the two shell parts being adapted to be mated together, and fastened by screw means such as screws 14.

Within the two housing shell parts, there are enclosed and supported, in this case, two rotatable reel assemblies indicated as 16—16, around which are wound respective electrical cords 18, having terminal plugs 20. A cord 18 can be extended by unwinding the cord from a reel 16 and retracted by winding the reel 16 up again, in a manner to be described below. The invention is not restricted to two reels, but contemplates one, two, three or more such reels as desired.

Completing the general portions of the assembly is a front cover plate 22, adapted to fit over the front of the housing.

Figure 2:
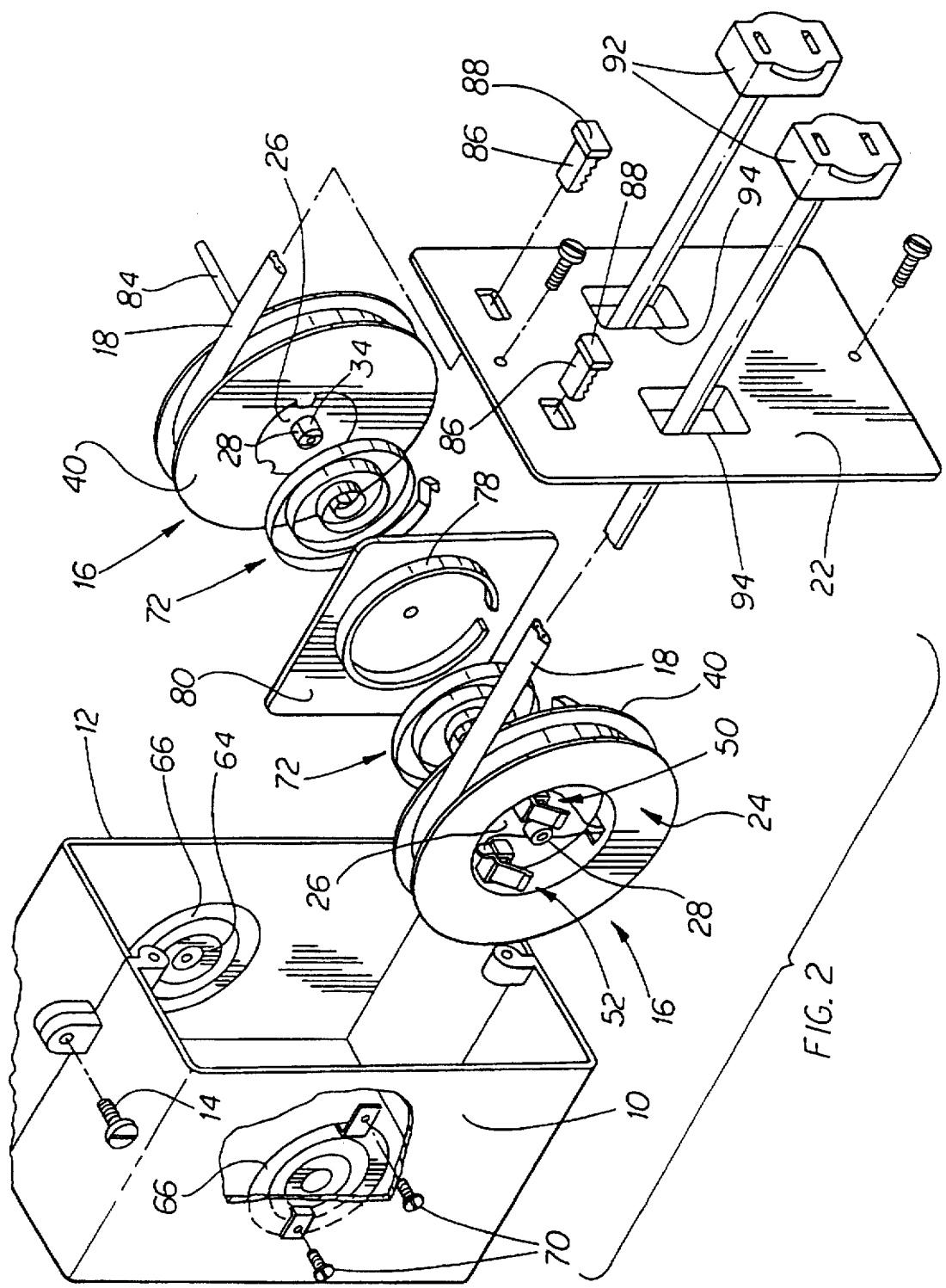
FIG. 2 is an exploded perspective illustration of a two reel embodiment of a retractable and extendable cord assembly illustrating the invention, suitable for mounting in a wall.

FIGS. 2, 3, and 4, illustrate one of the reel assemblies 16. It will be seen to comprise a first reel portion 24 having a central reel body 26, recessed with respect to portion 24. Within recess 26 is mounted an axial hollow hub 28. The reel body 26 has three fastening abutments 30 for reasons to be described below.

The reel body 26 has a slot 32 for reception of the inner end of the cord (to be described below). The hub 28 is formed with two bosses 34—34 on opposite sides, to act as a fastening point for the internal windings of a spring to be described below.

The body 26 is also formed with two spaced apart generally L-shaped slotted recesses 36—36 located within the recessed body 26 and spaced apart from one another, for reception of two electrical contact members to be described below.

The reel 16 further comprises a second reel part 40 (FIG. 2), which is generally flat and disc like in shape and defines a central opening 42, and three fastenings tabs 44—44. Screws (not shown) may pass through tabs 44 and be received in abutments 30, to hold the two reel parts 24 and 40 together.

In order to provide moving electrical contacts, a pair of electrical contact members 50, 52 are provided, each of which is of identical construction. Each contact 50–52 has a resilient contact tongue 54, depending from a support plate 56. Plate 56 is formed with angled teeth 58 for locking in position.

A connection arm 60 extends a right angles to plate 56 and is provided with a fastening hole 62.

The electrical wires at the inside ends of the cord 18 extend through slot 32 and may be secured to the respective arms 60 of the respective contacts 50 and 52 by suitable means such as screws, solder or the like, (not shown).

The plates 56 of the contact members are adapted to be received in respective slotted recesses 36—36 of the recessed reel body 26 and locked in position by the teeth.

In order to supply power to the two pairs of rotating contacts 50, 52, two pairs of contact rings each pair having a smaller inner contact ring 64 and larger outer contact ring 66. Contact rings 64 and 66 are non-rotatably concentrically mounted on the inner surfaces of respective shell parts 10 and 12 by integral moulding or the like. In this way reel portions 24 may lie close to the inner surfaces of walls 10 and 12 since the spring contacts 50 and 52 are mounted within the recessed reel body 26, and the contact tongues 54 extend outwardly from the recessed body only a minimum amount.

Contact rings 64 and 66 have respective connection tongues 68, which are moulded into respective shell parts 10 and 12 and pass through to the exterior where they support connection screws 70 (FIG. 2), for attachment to the electrical wiring in known manner, or they support prongs 71 (FIG. 4).

In order to rewind the reels and retract the cords springs 72 are provided having inner ends 74 and outer ends 76.

Springs 72 are received in annular walls 78, formed on opposite side of a common partition 80. Walls 78 have slots 82 for retention of outer ends 76. The inner ends 74 of springs 72 engage bosses 34 on hubs 28 of respective reels.

An axle rod 84 passes through both reels and through the partition 80 for providing a common rotational axis for both reels. In order to provide a lock for the reels, when the cords are extended, two locking bars 86—86 having buttons 88 are slidably mounted in cover plate 22, in suitable openings 90 in alignment with respective reels. When pushed in the bars engage and lock their respective reels, and when pulled out the springs will then rotate their reels and retract their cords. The cords having plugs 92 extend through ports 94 in plate 22 for extension and retraction.

The operation of this embodiment is self evident from the above description. The housing 10–12 is placed in an electrical box (not shown) of a type well known in the art, and the wiring is connected to the screws to provide power. Whenever required one or both of the cords can be drawn out and the plugs can be connected to electrical appliances as desired. The cords can be locked when extended by bars 86. When not required the bars can be released from their reels and the springs will rewind the reels and thus retract the cords. In this position the two plugs 92 can be used in the same way as conventional plugs in a standard receptacle, so that appliance cords (not shown) can simply be plugged in to plugs 92 without extending the cords at all.

Figure 6:
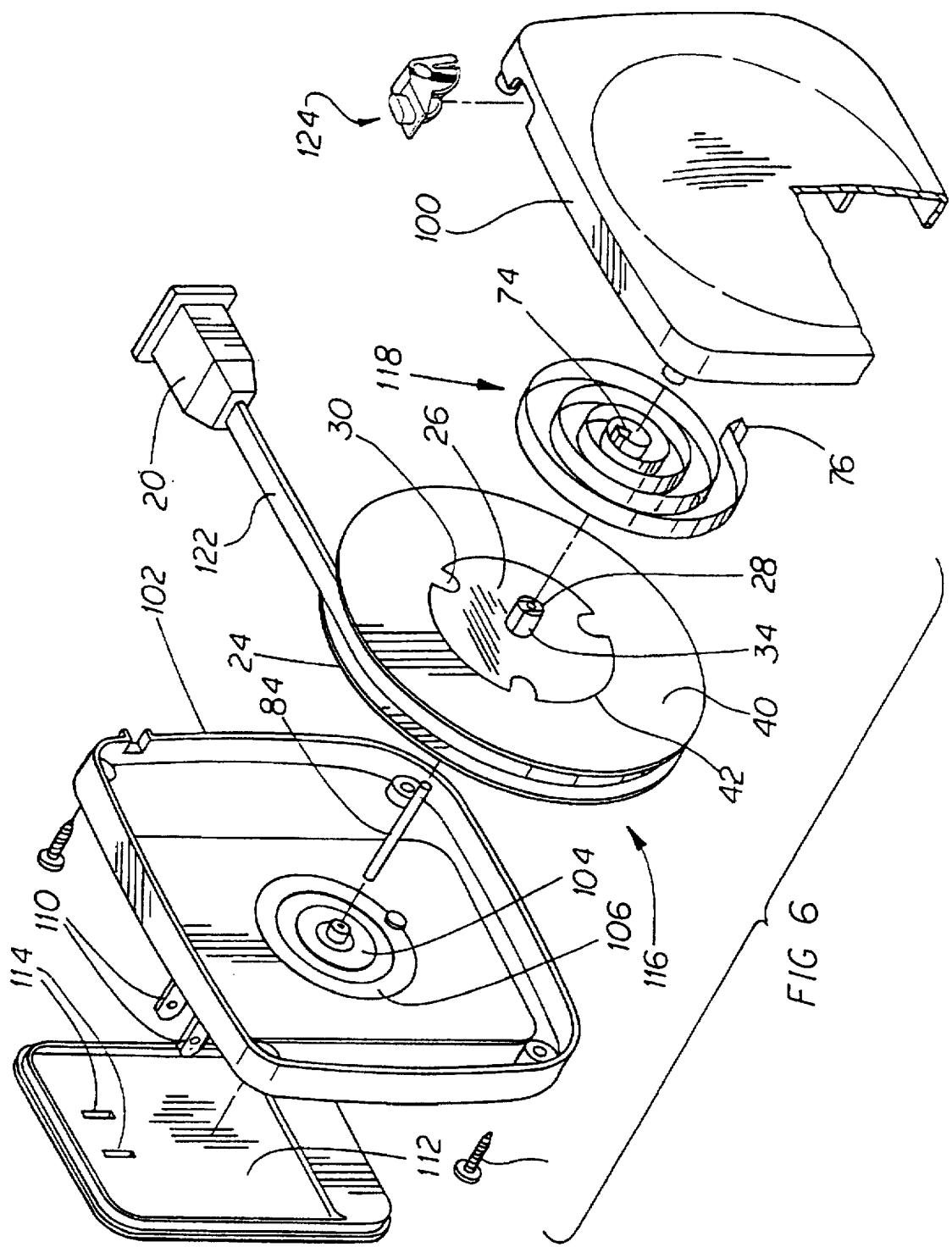
FIG. 6 is an exploded perspective of a further embodiment of a portable unit for plugging into a wall receptacle, and, FIG. 7 is a perspective of a locking device.

A somewhat different embodiment is shown in FIG. 6. This embodiment is intended to provide a portable extension cord unit which can be plugged into a standard electrical receptacle, and from which a cord within the unit can then be extended to connect with an electrical appliance. In this case the housing comprises front shell part 100 and rear shell part 102. Contact rings 104, 106 are secured by integral moulding to rear shell part 102, and connector strips 108 extend through part 102 and are connected to prongs 110 secured to the rearward side of the rearward shell part 102, by integral moulding. A cover plate 112 is attached to shell part 102 and prongs 110 pass through openings 114. The cover is secured to the exterior of the rearward shell part 102, for example by a friction fit, or by adhesive or other suitable means.

A reel assembly 116 is rotatably mounted between the shell parts and made essentially as shown in FIGS. 1 and 3. A coil spring 118 is adapted to fit within an annular cuff 120 formed on the inside of the front shell part and operates in the same way as described in FIG. 1.

Thus extension of the cord 122 by pulling it outwardly would unravel it from the reel and will tighten up the spring. Releasing of the cord will cause the spring to reverse rotate the reel and thus rewind the cord.

In order to provide a lock on the cord, a cord lock 124 is provided, having spaced apart spring fingers 126 adapted to fit around the outside of the cord and bear on the inside of the shell parts. The cord lock is swingably mounted within the two shell parts 100 and 102 by means of the hole 128 and a fastening screw. Two brake bands 130 fit on either side of the cord and engage opposite edges of the reel. The fingers urge the bands against the reel and, may be manually operated by button 132 to release the reel.

While two reels are shown side by side in FIG. 1 it will be appreciated that in some case a single reel could be mounted in a wall in this way. It will also be understood that three or more such reels could be wall mounted, in essentially the same manner.

The foregoing is a description of a preferred embodiment of the invention which is given here by way of example only.

The invention is not to be taken as limited to any of the specific features as described, but comprehends all such variations thereof as come within the scope of the appended claims.

What is claimed is:

1. A retractable electrical cord apparatus, for interconnection between electrical power means installed in a building fabric and a piece of electrical equipment and comprising:
   a hollow housing having inside surfaces, said housing being adapted to be mounted in a standard electrical wiring box in said building fabric;
   at least one reel rotatably mounted within the hollow housing and having a reel portion lying in a predetermined plane close to a said inside surface of said housing;
   a reel body formed integrally with said reel portion and recessed with respect thereto away from said inside surface of said housing, said reel being formed of a main reel component having a flange on one side, and a secondary flange component attached to said main reel component, said recessed reel body being formed in said main reel component;
   an electrical cord wound upon said at least one reel;
   a retraction spring connected to said reel, and adapted for rewinding the reel to retract the cord;
   first and second electrical spring contact members mounted on said reel in said recessed reel body in spaced apart relation said contacts being rotatable in unison with said reel body, and ends of said electrical cord being connected through openings in said reel body to respective said contact members and being rotatable in unison with said reel;
   first and second non-rotatable contact rings mounted on said inside surface of said housing and engaged by respective said electrical spring contact members on said recessed reel body, as said reel rotates;
   said first and second contact rings being connectable to said electrical power means in said building fabric; and wherein said housing is made up of first and second shell parts, adapted to interfit together to enclose said at least one reel, and wherein said shell parts are secured together, to form said hollow housing, and includes an annular retaining ring means for retaining said retraction spring therein.

2. A retractable electrical cord apparatus as claimed in claim 1 wherein said first and second shell parts comprise right and left housing parts, and including a front cover plate attachable to said hollow housing for closing the same.

3. A retractable electrical cord apparatus as claimed in claim 2 and including cord opening means for passage of said electrical cord therethrough in said front cover plate and brake opening means registering with said reel and reel braking means within said housing operable for braking said reel therein.

4. A retractable electrical cord apparatus as claimed in claim 1 wherein each of said two shell parts has two of said contact rings mounted on an inside surface thereof, first and second electrical connecting means for connecting to said rings and to said electrical power means within said building fabric.

5. A retractable electrical cord apparatus as claimed in claim 4 and wherein said electrical connection means includes connection tongues extending from said contact rings and integrally formed therewith and wherein said connection tongues are integrally embedded in respective said shell parts and extend through said respective said shell parts.

6. A retractable electrical cord apparatus as claimed in claim 1 and including an axial boss member on said recessed reel body, and engagement means formed therein for connection with an inner end of said spring.

7. A retractable electrical cord apparatus as claimed in claim 1 and including retaining means formed in said housing in engagement with an outer end of said spring.

8. A retractable electrical cord apparatus as claimed in claim 1 wherein there are at least two said reels and retraction springs and including partition wall means having two sides formed within said shell parts, and located between said reels, and said annular retaining ring means formed on both sides of said partition wall means for retention of respective retraction springs on opposite sides of said partition wall means.

9. A retractable electrical cord apparatus as claimed in claim 1 wherein said contact members are formed with wall portions having teeth formed thereon, and wherein said recessed reel main body has two slotted recesses for receiving respective said wall portions, of said respective contact members, with said teeth frictionally engaging said reel body and retaining said contact members in position.

10. A retractable electrical cord apparatus as claimed in claim 9 and wherein resilient contact arms extend from said wall portions outwardly with respect to said recessed reel body for rotation in unison therewith for contacting respective said non-rotatable contact rings on said inside surface of said housing.

11. A retractable electrical cord apparatus as claimed in claim 1 and including brake means engageable with said at least one reel for preventing retraction of said cord by said reel.

12. A plurality of retractable electrical extension cords for mounting in a wall and comprising;
   a hollow housing adapted to be mounted in said wall and having two inside surfaces located on opposite sides of the interior of said housing;
   a plurality of reels rotatably mounted within the hollow housing each said reel having a reel portion lying in a predetermined plane close to a respective said inside surface of said housing; and
   a reel body formed integrally with each said reel portion and recessed with respect thereto away from said respective inside surface of said housing;
   electrical cords wound upon respective said reels;
   retraction springs connected to respective said reels, and adapted for rewinding said reels to retract their respective cords;
   first and second electrical spring contact members mounted on respective said reels in said recessed reel bodies in spaced apart relation and rotatable in unison therewith, and ends of said electrical cords being connected to respective said contact members and being rotatable in unison with respective said reels;
   pairs of first and second non-rotatable contact rings mounted on respectives ones of said opposite inside surfaces of said housing and engaged by respective first and second electrical contact members, as said reels rotate, and,
   connection means for connecting said contact rings to a source of electrical supply.

13. A retractable electrical cord as claimed in claim 12 wherein said housing comprises two opposed shell parts defining respective said opposed inside surfaces wherein each of said contact rings in each said pair has a connection tongue formed therewith, and wherein said connection tongues are integrally moulded with respective said shell parts and extend therethrough.

14. A retractable electrical cord as claimed in claim 13 and wherein annular walls are formed on a member in said housing for receiving respective said springs therein.

15. A retractable electrical cord apparatus as claimed in claim 14 and including a front cover plate attached to said shell parts and two cord opening means formed in said front cover plate for passage of said electrical cords therethrough and cord locking means within said front cover plate operable to engage said reels and lock the same against rotation and being manually releasable for retraction of said cords.

16. A retractable electrical cord apparatus as claimed in claim 15, and including record opening means formed in at least one of said shell parts for passage of said electrical cord therethrough and cord locking means within said shell parts operable to engage said reel and lock the same against rotation and being manually releasable for retraction of said cord.

17. A retractable electrical cord apparatus, for interconnection between electrical power means in a wall receptacle in a building fabric and a piece of electrical equipment and comprising;

a hollow housing made up of front and rear shell parts;

at least one reel rotatably mounted within said hollow housing;

an electrical cord wound upon said at least one reel;

a retraction spring connected to said reel, and adapted for rewinding the reel to retract the cord;

first and second electrical contact members mounted on said reel in spaced apart relation and rotatable therewith, and ends of said electrical cord being connected to respective said contact members;

first and second non-rotatable contact rings mounted within said housing and engaged by respective said first and second electrical contact members, as said reel rotates;

and wherein said rear shell part has means for positioning said non-rotatable contact rings therein;

first and second electrical connecting means connecting to respective said contact rings; and first and second electrical prongs connected to said connecting means for insertion into a said wall receptacle.

18. A retractable electrical cord as claimed in claim 17 wherein each of the electrical connecting means has a connection tongue formed with one of said contact rings, and wherein said connection tongues are integrally moulded with said rear shell part and extend therethrough, and wherein said prongs are integrally embedded in said rear shell part, and including a cover plate attached to said rear shell part and slots in the cover plate through which said prongs extend.

19. A retractable electrical cord as claimed in claim 18 and wherein an annular wall is formed on said front shell part for receiving said spring therein.

20. A retractable electrical cord apparatus as claimed in claim 17 and wherein said reel includes a main reel component having a flange on one side, said main reel component being formed with a recessed reel body, and including an axial boss member on said recessed reel body, and engagement means formed therein for connection with an inner end of said spring.

21. A retractable electrical cord apparatus as claimed in claim 20 and including retaining means formed in said housing in engagement with an outer end of said spring.

22. A retractable electrical cord apparatus as claimed in claim 17 wherein said contact members are formed with wall portions having teeth formed thereon, and wherein said recessed reel main body has two slotted recesses for receiving respective said wall portions of said respective contact members, with said teeth frictionally engaging said reel body and retaining said contact members in position.

\* \* \* \* \*